United States Patent [19]

Dubin

[11] 4,431,547

[45] * Feb. 14, 1984

[54] USE OF ACRYLAMIDE/ACRYLIC ACID COPOLYMERS FOR PREVENTION OF FOULING BY $CA_3(PO_4)_2$

[75] Inventor: Leonard Dubin, Skokie, Ill.

[73] Assignee: Nalco Chemical Company, Oak Brook, Ill.

[*] Notice: The portion of the term of this patent subsequent to Nov. 30, 1999 has been disclaimed.

[21] Appl. No.: 447,922

[22] Filed: Dec. 8, 1982

Related U.S. Application Data

[63] Continuation of Ser. No. 295,425, Aug. 24, 1981, abandoned.

[51] Int. Cl.$^3$ .............................................. C02F 5/10
[52] U.S. Cl. .................................... 210/701; 252/180
[58] Field of Search ................ 210/698, 701; 252/180, 252/181

[56] References Cited

U.S. PATENT DOCUMENTS

| | | | |
|---|---|---|---|
| 3,463,730 | 8/1969 | Booth et al. | 210/701 |
| 3,663,448 | 5/1972 | Ralston | 252/180 |
| 3,699,048 | 10/1972 | Krueger et al. | 210/701 |
| 3,890,228 | 6/1975 | Hwa et al. | 252/180 |
| 4,008,164 | 2/1977 | Watson et al. | 210/698 |
| 4,029,577 | 6/1977 | Goldlewski et al. | 210/701 |
| 4,361,492 | 11/1982 | Dubin | 252/180 |

*Primary Examiner*—Peter A. Hruskoci
*Attorney, Agent, or Firm*—John G. Premo; Robert A. Miller; Donald G. Epple

[57] ABSTRACT

A copolymer consisting of a 3:1 ratio of acrylamide to acrylic acid with a molecular weight of approximately 10,000 is very effective in preventing calcium phosphate fouling of heat transfer surfaces as found, for example, in cooling water.

1 Claim, No Drawings

USE OF ACRYLAMIDE/ACRYLIC ACID COPOLYMERS FOR PREVENTION OF FOULING BY $Ca_3(PO_4)_2$

This application is a continuation of application Ser. No. 295,425, filed Aug. 24, 1981 now abandoned.

THE INVENTION

A copolymer consisting of a 3:1 ratio of acrylamide to acrylic acid with a molecular weight of approximately 10,000 is very effective in preventing calcium phosphate fouling of heat transfer surfaces as found, for example, in cooling water. This copolymer appears to both stabilize and inhibit the formation of $Ca_3(PO_4)_2$ as well as disperse particulate $Ca_3(PO_4)_2$, even under the negative influence of soluble iron ($Fe^{2+/3+}$) as found, for example, as a corrosion by-product of mild steel heat transfer tubes or naturally in water. The polymer also exhibits particulate dispersancy for $Fe_2O_3$, $CaCO_3$, mud, silt, etc.

The amount of copolymer used is usually but a few ppm. Generally, dosages may range between 1–50 ppm with a preferred range being 5–30 ppm.

PROCEDURE FOR O-$PO_4$ FILTRATION TEST

($Ca_3(PO_4)_2$ Stabilization Test)

(Note all chemicals are reagent except for treatments)

1. Put 300 to 350 ml of DI water in the 600 ml jacketed beakers and let stand with mild stirring until temperature is brought to 158° F. (70° C.) by use of a constant temperature water bath.
2. Put in required ml of stock hardness into jacketed beakers:
    For 250 ppm $CaCO_3$, use 50 ml;
    For 500 ppm $CaCO_3$, use 100 ml.
    To make 2 liters of stock solution:
    (1) Dissolve 7.356 g $CaCl_2.2H_2O$ in 800 ml DI $H_2O$.
    (2) Dissolve 6.156 g $MgSO_4.7H_2O$ in 800 ml DI $H_2O$.
    (3) Add both solutions to 2 liter volumetric flask and dilute to volume.
    (4) Shake well.
*3. Add sufficient ml of treatment into jacketed beakers while stirring.
4. Add DI water to make 500 ml in jacketed beakers (add water to line on beaker with stirrer not operating.)
5. With stirring, let solutions in beakers equilibriate to 158° F.
**6. With stirring, adjust pH to 8.5 with dilute (0.1–0.4 N) NaOH.
***7. Add 3 ml of 1000 ppm $PO_4$, pH-8.5, solution to jacketed beakers and wait about 3–5" while stirring.
8. Check pH of solution in beakers and, as necessary, adjust pH to 8.5±0.1 while stirring.
9. Let experiment run at 158° F. with stirring for 30 minutes.
10. After 15 minutes, check pH of solutions in beakers and, as necessary, adjust pH to pH 8.5±0.1.
11. After the 30 minutes is up, the solution is immediately filtered through 0.45 micron filter paper under vacuum. The filtered solution is analyzed for O-$PO_4$ using standard procedures and the color evaluated in the Spec 20 to 700 nm.
12. The results are reported as percent inhibition calculated by the following formula:

% inhibition =

$$\left[ \frac{(\text{residual O}-PO_4) - (\text{blank residual O}-PO_4)}{(\text{initial O}-PO_4) - (\text{blank residual O}-PO_4)} \right] \times 100$$

where:
  initial-O-$PO_4$ = O-$PO_4$ concentration in the mixture at the beginning of the experiment.
  residual-O-$PO_4$ = O-$PO_4$ concentration in the filtrate at the end of the experiment with stabilizer.
  blank residual-O-$PO_4$ = O-$PO_4$ concentration in the filtrate at the end of the experiment with no stabilizer.

*Stock Stabilizer Solution:
  Dissolve 1.000 grams of stabilizer in enough distilled water to make one liter of solution. This solution is 1000 ppm stabilizer.
  Alternate: Dissolve enough treatment to make a 1000 ppm actives stock solution.

**If iron is used in the experiment, it is added before the first pH adjustment and after thermal equilibrium is reached. Method of making stock iron solutions is given below:
Ferrous Sulfate Stock Solution:
  A. Stabilized—dissolve 2.482 grams of ferrous sulfate heptahydrate and 3.080 grams of hydroxyl amine hydrochloride in enough distilled water to make one liter of solution. This solution is 500 ppm Fe (Fe in the 2+ oxidation state). The hydroxyl amine hydrochloride stabilizes the iron towards oxidation to the 3+ state in the stock solution and also after addition to the experiment.
  B. Unstabilized—dissolve 2.482 grams of ferrous sulfate hepta hydrate in enough de-aerated distilled water to make one liter of solution. This solution is 500 ppm Fe (Fe in the 2+ oxidation state). The iron is stabilized in the stock solution towards oxidation to the 3+ state, but not after addition to the experiment. The distilled water was de-aerated by bubbling nitrogen gas through a coarse sparger for two hours.

***Ortho-Phosphate Stock Solution:
  Dissolve 1.214 grams of 85% ortho-phosphoric acid in approximately 800 ml of distilled water. Add approximately 1.68 grams of 50% sodium hydroxide solution such that the pH of the solution is 8.5±0.1. Dilute the neutralized solution to one liter with distilled water. This solution is 1000 ppm ortho-phosphate ($PO_4$) neutralized to the dibasic anion. To test solution, dilute 6 ml into 1000 ml DI and analyze for O-$PO_4$ per standard ortho-phosphate procedure. This should give 6 ppm $PO_4$.

The invention is illustrated and set forth in the Table.

TABLE I

| Polymer Description | and | Molecular Weight | % $Ca_3PO_4$ Inhibition (24 ppm actives, hardness-500 ppm at $CaCO_3$, pH-8.5, 6 ppm $PO_4$) |
|---|---|---|---|
| 3:1 AM/AA | | 7–11,000 | 92.1 |
| 7:3 AA/AM | | 30,000 | 42.2 |
| 7:3 AA/AM | | 4,000 | 20.9 |

AA - Acrylic acid
AM - Acrylamide

From the above, it is evident that the very specific compositions of the invention produce improved results. Other ratios of acrylamide and acrylic acid and other molecular weight ranges produce relatively poor results.

The acrylic acid as used in describing this invention includes the water-soluble salts thereof such as the sodium ammonia or amine salts.

Having thus described my invention, it is claimed as follows:

1. A method of preventing the fouling of heat transfer surfaces in contact with industrial cooling waters which contain the fouling producing chemical calcium phosphate, which comprises treating such waters with from 1-50 ppm of acrylamide/acrylic acid copolymer having weight ratio of 3:1 and a molecular weight between 7,000-11,000, to stabilize and inhibit the formation of calcium phosphate, and to disperse particulate calcium phosphate.

* * * * *